Patented Mar. 10, 1936

2,033,514

UNITED STATES PATENT OFFICE 2,033,514

CINCHONA ALKALOID DERIVATIVE

Leonard H. Cretcher, William L. Nelson, Courtland L. Butler, and Alice G. Renfrew, Pittsburgh, Pa., assignors to Mellon Institute of Industrial Research, a corporation of Pennsylvania No Drawing. Application March 19, 1934,
Serial No. 716,328

3 Claims. (Cl. 260—26)

This invention relates to derivatives of cinchona alkaloids, and consists in new compositions of matter, specifically, hydroxyethyl ethers of the cinchona alkaloids.

In an application already filed two of the present applicants, namely, Cretcher and Nelson, have disclosed the hydroxyethylated product of hydrocupreine. The further investigations of the present applicants bring to light a generic field of invention within which the specific product just characterized lies. This wider and generic field may be defined as the field of the hydroxyalkylation products of phenolic-hydroxyl-group-containing cinchona alkaloids or their derivatives. That wider and generic field of invention here is claimed.

In the practice of this invention the hydroxyethylation of the phenolic-hydroxyl-group-containing alkaloids or their derivatives may be accomplished according to the disclosure of the application of Cretcher and Nelson filed September 25, 1933, Serial No. 690,946, alluded to above, or they may be prepared by other and subsequently discovered methods. According to the procedure disclosed in the Cretcher and Nelson application alluded to, quinine sulphate was reduced to dihydroquinine and the latter was demethylated to dihydrocupreine, in accordance with the procedure of Heidelberger and Jacobs (Jour. Am. Chem. Soc. 1919, XLI, 817). 1.84 gm. of sodium (.08 mol) was dissolved in 100 cc. of absolute alcohol and 24.96 gm. of dihydrocupreine (.08 mol) was dissolved in the warm alcohol. 8.40 cc. of freshly distilled chlorethylvinyl ether (chlorethylvinyl ether has been observed to polymerize slowly on standing at room temperature) was added and the solution was heated in a sealed tube for 22 hours at 92–94° C. The cooled solution was poured into 200 cc. of dilute hydrochloric acid (containing 30 cc. of conc. HCl) and the aqueous solution was extracted twice with ether. By the action of HCl the vinylethyl ether of hydrocupreine, prepared as described above, is converted into the hydroxyethyl ether of hydrocupreine. (See Cretcher, Koch, and Pittinger, "The Synthesis of 5-β-Hydroxyethyl-Barbituric Acid and its Alkyl Derivatives," (Jour. Am. Chem. Soc. 1925, XLVII, 3083.) The base was precipitated by the slow addition of an excess of ten per cent sodium hydroxide in a large separatory funnel and extracted twice with ether. The ethereal solution was washed with water and extracted with 200 cc. of dilute hydrochloric acid (containing 15 cc. conc. HCl). The base was again precipitated with an excess of ten per cent sodium hydroxide and extracted with ether by long continued shaking. A residue insoluble in both alkali and ether was rejected. The ethereal solution was washed with water and extracted with 200 cc. dilute hydrochloric acid (15 cc. of conc. HCl). The base was precipitated for the third time with alkali and allowed to stand until the gummy precipitate settled out. The mother liquor was decanted and the precipitate was washed several times with water by decantation. The gummy base was allowed to dry in a warm place for several days until it could be powdered. It was then dissolved in absolute alcohol and 2N alcoholic hydrochloric acid was added until the solution was acid to Congo red. The solution was allowed to stand in the cooler until precipitation was complete and was then filtered. The mother liquor was evaporated at a low temperature under reduced pressure to somewhat less than half the original volume and an additional amount of the hydrochloride was obtained. The air-dried salt weighed 9.3 gm. The hydrochloride was dissolved in water and the base was precipitated with dilute ammonia. The air-dry base weighed 6.9 gm. The dry base was crystallized from dry acetone at 0° with some difficulty, due to the formation of a gummy precipitate, which, however, was redissolved in acetone and yielded a crystalline precipitate. After a third crystallization the yield was 3.3 gm.

The crystal form of the base could not be ascertained. It fuses between 105° and 112° C.

on fairly rapid heating. .2357 gm. in 10.08 cc. absolute alcohol gave an optical rotation of −3.09° in a 1 dm. tube.

$$[\alpha]_D^{23} = -132.1°.$$

The di-hydrochloride was prepared from the crystalline base in a solution of absolute alcohol by the addition of HCl in the manner described above. Dry ether was added to incipient crystallization and the solution cooled until crystallization was complete. The salt was filtered, washed with ether, and recrystallized from absolute alcohol in the same manner. White needles, melting with decomposition at 234°. 0.1051 gm. of dried (over $P_2O_5$) salt in 10.08 cc. absolute alcoholic solution had an optical rotation of −1.34° in a 1 dm. tube.

$$[\alpha]_D^{23} = -128.5°.$$

*Analysis.*—Calc. for $C_{21}H_{30}O_3N_2Cl_2$; C, 58.71; H, 7.05; N, 6.53; Cl, 16.52. Found: C, 58.46, 58.66; H, 7.02, 7.17; N, 6.40, 6.36; Cl, 16.38, 16.39.

The acetate may be prepared by heating the base with acetic anhydride.

In addition to the procedure just described, the hydroxyethylation of hydrocupreine may be accomplished by either of the following methods.

1. Alkylation of hydrocupreine with ethylene chlorohydrin

Hydrocupreine is converted to sodium or potassium salt and the hydroxyethyl group is introduced by alkylation (conveniently) in alcoholic solution with chlorohydrin. Alkylation occurs on heating for one hour or on standing over night at room temperature. The alcohol is then evaporated from the solution and the residue is taken up in dilute hydrochloric acid. The acid solution is made alkaline under a layer of ether and the desired base is extracted with ether. The ether solution is dried with anhydrous sodium sulfate. The base is isolated as dihydrochloride. $[\alpha]_D$ about −177° in water after crystallization from alcohol.

2. Alkylation with glycol monotoluenesulfonate

Hydrocupreine is converted to sodium or potassium salt and the hydroxyethyl group is introduced by alkylation (conveniently) in alcoholic solution with glycol monotoluenesulfonate. Alkylation occurs on heating for several hours, or on standing for several days at room temperature. The desired product is worked up as described above. $[\alpha]_D$ about −177° for the dihydrochloride.

3. Alkylation with toluenesulfonylglycol acetate

Hydrocupreine is converted to sodium or potassium salt and the acetyl derivative of hydroxyethylhydrocupreine is prepared by alkylation in alcoholic solution with toluenesulfonylglycol acetate. Alkylation occurs on heating for several hours. The product was worked up as described above. Acetoxyethylhydrocupreine has an optical rotation of $[\alpha]_D$ −113° in alcohol. This acetate may be converted to hydroxyethylhydrocupreine by hydrolysis.

4. Alkylation with toluenesulfonylglycol benzoate

Hydrocupreine is converted to sodium or potassium salt and the benzoyl derivative of hydroxyethylhydrocupreine is prepared conveniently in alcoholic solution by alkylation with toluenesulfonylglycol benzoate. The reaction mixture is heated for 4 hours. The benzoate was isolated as neutral sulfate of melting point 228° and $[\alpha]_D$ −103.4° in water. Hydroxyethylhydrocupreine may be prepared from the benzoate by hydrolysis.

Apoquinine is prepared according to the well-known method (Hesse, Ann. CCV, 314, 1880 and Fränkel and Buhlea, Ber. LVIII, 559, 1925) except for two slight modifications. These consist in increasing slightly the proportion of quinine to hydrochloric acid, and reducing the minimum time of heating (at 140–150° C.) from 7 hours to 5. A sodium or potassium salt of apoquinine is prepared and digested with ethylene chlorohydrine or other hydroxyethylating reagent, chloroethyl vinyl ether, glycol monotoluene sulfonate, hydroxydiethyl-sulfate, toluenesulfonylglycol acetate, toluenesulfonylglycol benzoate. The desired hydroxyethylated product is then separated from the reaction mixture.

More conveniently, apoquinine prepared according to the usual method, modified as stated above, is partially purified before submitting it to the action of the hydroxyalkylating agent. To this end 2 parts of apoquinine are dissolved in 9 parts of absolute alcohol. The base is converted to dihydrochloride by passing dry HCl gas into the solution until it is acid to methyl orange. Five parts of anhydrous ether are then added and the mixture is allowed to stand until crystallization is complete. Partially purified apoquinine dihydrochloride is then filtered off, washed twice with 1:1 ether alcohol mixture, and several times with dry ether. 1.4 to 1.6 parts of salt $[\alpha]_D$ −198° in water are obtained.

The so obtained apoquinine dihydrochloride is converted to sodium or potassium salt and the hydroxyethyl group is introduced by alkylation, (conveniently) in alcoholic solution with ethylene chlorohydrine. The reaction is run for one hour at water bath temperature or for 24 hours at room temperature.

The desired product, hydroxyethylapoquinine is worked up by evaporating the alcohol from the solution and taking up the residue in dilute hydrochloric acid. The acid solution is made strongly alkaline under a layer of ether. The desired base is extracted with ether and the ether solution is dried with anhydrous potassium carbonate or sodium sulfate. The base is thrown out of ether solution as dihydrochloride by addition of alcoholic hydrochloric acid, using methyl orange as indicator. The salt can be crystallized from a mixture of alcohol and ether. It melts at 228° with decomposition.

In both the procedures described, the hydroxyethyl group is introduced into the apoquinine by producing first in alcoholic solution a salt of an alkali metal and by adding ethylene chlorohydrine. Other metallic salts may be used as the intermediate product and other hydroxyethylating reagents may be used; also other solvents than alcohol. The intermediate product may, in any preferred manner, be brought into intimate association with the hydroxyalkylating reagent, whether by means of solution, suspension in a liquid carrier, or otherwise.

Typically, the hydroxethylation of apoquinine may be represented as the change from the formula

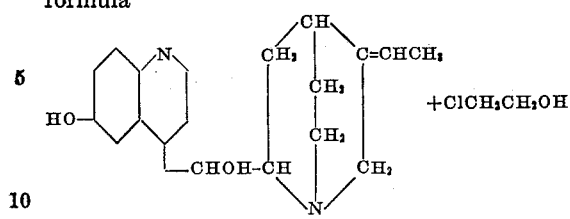

to the formula

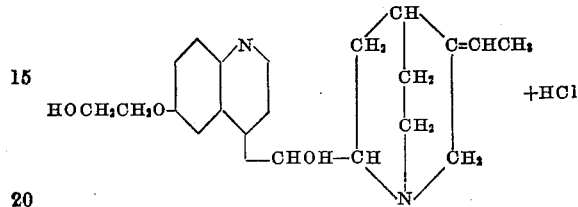

The product is an hyroxyethyl derivative of apoquinine, and it is a new and useful product. It has high pneumococcocidal value and, this with low toxicity. We have reason to believe that it may be administered without producing in the patient those visual disturbances sometimes produced by the commonly used ethyl dihydrocupreine.

The method described above is applicable, not to apoquinine alone, but to those other cinchona alkaloids and their derivaties as well, that have a phenolic hydroxyl group. Those others are apoepiquinine, apoquinidine, apoepiquinidine, cupreine, hydrocupreine, cupreidine, hydrocupreidine, epihydrocupreine, and epihydrocupreidine, and in addition synthetic derivatives of all of the above mentioned alkaloids such as their nitro, amino, and hydroxyl compounds. The products of hydroxyethylation are isomers or homologs or derivatives of the product derived from apoquinine, and have like utility. The product of the treatment of hydrocupreine will be recognized to be that disclosed in the application of Cretcher and Nelson, filed September 25, 1933, Serial No. 690,946. The methods of formation here described are, however, new.

We claim as our invention:
1. The product of hydroxyethylation of a phenolic-hydroxy-group-containing cinchona alkaloid by substitution in the phenolic OH group.
2. As a new composition of matter, an hydroxyethyl derivative (in which the hydroxyethyl group is attached as a phenol ether) of a phenolic-hydroxyl-group-containing cinchona alkaloid, wherein the alkaloid has been demethylated, rearranged from

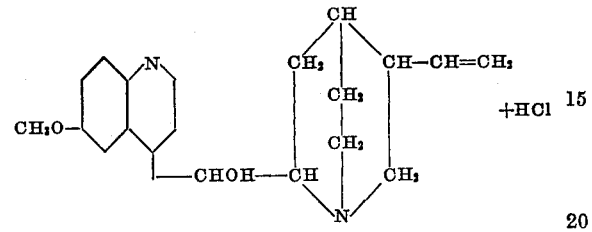

to

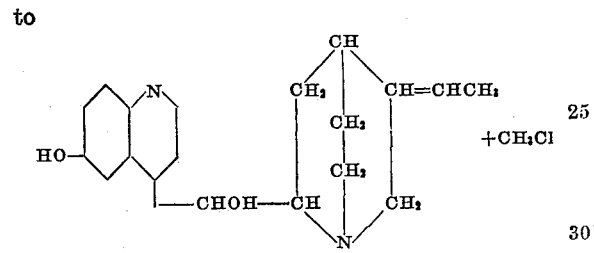

and realkylated with an hydroxyalky alkylating agent.
3. The method herein described of preparing a hydroxyethylated cinchona alkaloid from a demethylated cinchona alkaloid which consists in bringing into association with a quantity of an alkali-metal salt of the demethylated cinchona alkaloid ethylene chlorohydrin, and separating the product of the ensuing reaction.

LEONARD H. CRETCHER.
WILLIAM L. NELSON.
COURTLAND L. BUTLER.
ALICE G. RENFREW.